July 11, 1944.     M. E. NORDBERG     2,353,354
BLACK GLASS
Filed March 24, 1941
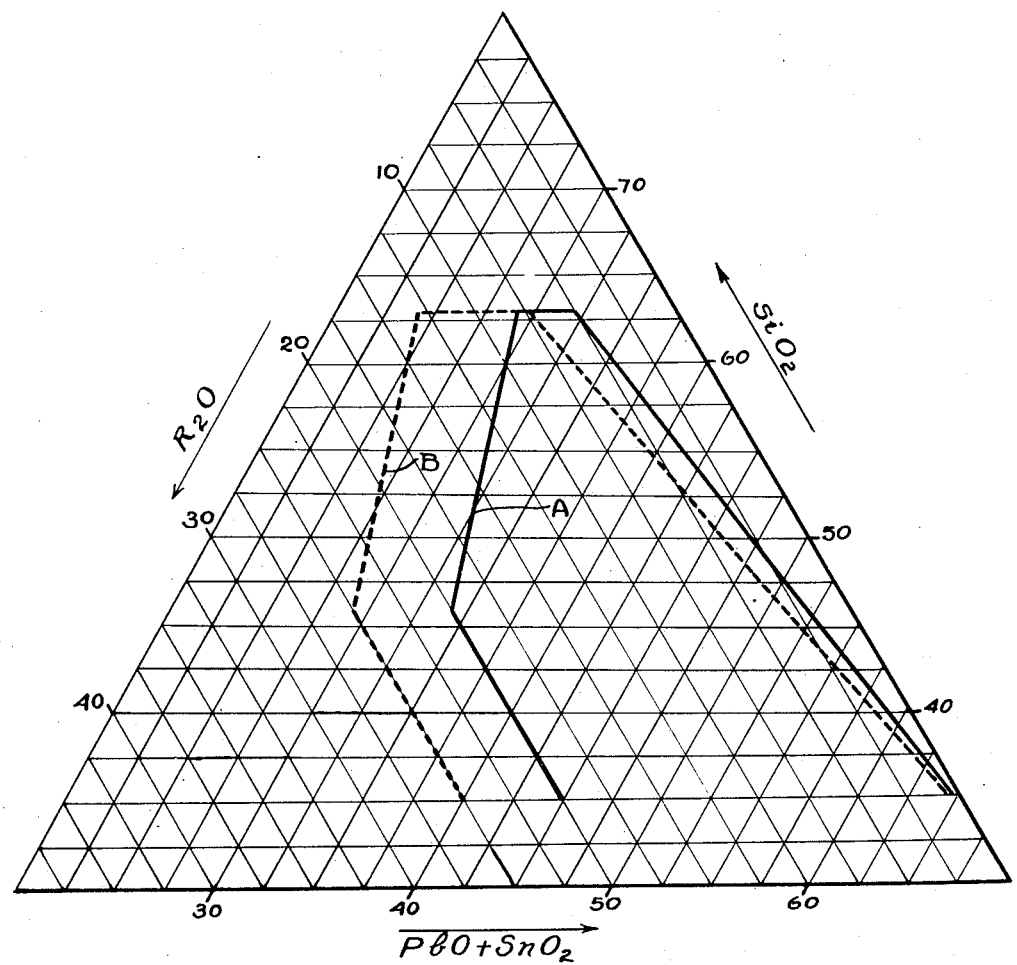
Inventor
MARTIN E. NORDBERG
By *F. H. Knight*
Attorney Patented July 11, 1944

2,353,354

UNITED STATES PATENT OFFICE 2,353,354

BLACK GLASS

Martin E. Nordberg, Corning, N. Y., assignor to Corning Glass Works, Corning, N. Y., a corporation of New York Application March 24, 1941, Serial No. 384,977

15 Claims. (Cl. 106—53)

This invention relates to glass compositions and has for its primary object the production of a black glass.

Another object of the invention is to produce a heat sensitive black glass the color of which can be developed or discharged by proper heating and cooling.

Another object is to produce a glass article comprising one homogeneous composition throughout, selected portions of which are black.

A further object is to produce black glass fibres.

I have discovered that certain glasses containing silica, alkali metal oxide, lead oxide, and tin oxide, and melted reducingly through the addition of a reducing agent to the batches therefor are heat-sensitive and can be made clear or opaque black, as desired, by proper heat treatment. Such glasses, at sufficiently high temperatures, are clear and, if cooled with relative rapidity, will remain clear but, if reheated or held at temperatures in or slightly above their upper annealing range for a short time, they become black and remain so on cooling. The black glass can be cleared by reheating at a sufficiently high temperature, which may be determined by trial. Thus the glasses can be obtained either clear or black at room temperature and thereafter can be changed to black or clear respectively by proper heat treatment. By differential heating or cooling, articles can be produced in which selected portions are black or clear. The use of a reducing atmosphere during heat treatment is not only unnecessary but is useless for this type of glass which blackens throughout its mass. The new glasses are suitable for the production of black glass fibres. The black glasses transmit no light and reflect no color.

Ordinarily when a glass containing a substantial amount of lead oxide is melted reducingly, metallic lead precipitates or discolors the glass objectionably. I have found that within a certain range of compositions such reduction of the lead oxide is inhibited by the addition of tin oxide to the glass, whereupon the reduced glass acquires the above mentioned characteristics. While the reaction is not definitely known, it is believed that at high temperatures there is a preferential tendency for at least a part of the stannic oxide to be reduced to stannous oxide, and at temperatures in or slightly above the upper annealing range of the glass the oxidation-reduction equilibrium is reversed and the stannous oxide reduces the lead oxide to metallic lead, being itself oxidized to stannic oxide. Rapid cooling through this range prevents such reversal. These temperatures are too low to allow the lead to precipitate or agglomerate and it remains highly dispersed, making the glass black. Therefore these glasses when melted reducingly contain at least a portion of the heavy metals (lead and tin) in a low state of oxidation, the clear glass containing stannous oxide and the black glass containing also metallic lead.

In the drawing is shown a ternary diagram illustrating graphically, in terms of weight percent of oxides as calculated from batch compositions, the approximate preferred fields of glasses which are suitable for the practice of my invention. In order to represent the four-component glasses as a system of three components, the tin oxide is considered as being substituted for lead oxide and the three components then become $SiO_2$ (silica), $R_2O$ ($Na_2O+K_2O$) and $PbO+SnO_2$ (lead oxide plus stannic oxide). Although the amount of stannic oxide preferably should be between 2% and 15% of the total glass composition, the amount which may be used is not so limited, as will appear. Curve A encloses the field of compositions in which the alkali is $Na_2O$ and curve B encloses the field in which the alkali is $K_2O$. Although the curves extend to a preferred minimum silica content of 35%, they remain open at this level indicating that glasses of still lower silica content are within the scope of the invention. The upper limit of silica for both curves is 63%. For any given silica content the alkali content as shown by curve A will vary from $(5-.17X)\%$ to $(8+.7X)\%$ but not over 20% $Na_2O$, X being the deficiency in silica below 63%. Similarly, for a given silica content the alkali content as shown by curve B will vary from $(7-.24X)\%$ to $(13+.7X)\%$ but not over 25% $K_2O$, X being the deficiency in silica below 63%. Considering the two fields combined, the alkali content will vary from $(5+2A)-(.17+.07A)X\%$ to $(8+5A+.7X)\%$ but not over $(20+5A)\%$ $R_2O$, where A is the ratio $$\frac{K_2O}{R_2O}$$

and X is the deficiency in silica below 63%. In each instance the remainder of the composition is substantially lead oxide and tin oxide.

Other considerations essential for the successful practice of my invention are as follows: The glasses must contain tin oxide, because without it the lead would be precipitated during melting and the glasses would not be heat sensitive. With high stannic oxide content some glasses are normally opal due to the insolubility of stannic oxide. However, when melted in accordance with the invention with a sufficient amount of reducing agent, such glasses may be clear due to the reduction of the stannic oxide. In such a case stannous oxide appears to be a good flux. In view of the insolubility of high stannic oxide contents and also the high cost of this material, a content not exceeding about 15% is preferable. On the other hand, as the tin oxide content is decreased, excessive reduction must be avoided in order to prevent objectionable separation and segregation of metallic lead. Consequently it is preferable to use at least 2% of stannic oxide, although smaller amounts are also effective. As reducing agents, sulfur and the sulfides are particularly effective and glasses reduced thereby are particularly heat sensitive and develop a very dense black. Other materials having a reducing effect may be employed, such as carbon and carbonaceous materials, and powdered metals. Small amounts of other constituents such as lime, boric oxide, alumina, etc., may be included in the composition. For calculating the compositions, such extra constituents may be considered as substituted for lead oxide.

Without limiting the invention thereto, the following batches in parts by weight are given as examples of glasses which may be employed:

|  | 1 | 2 | 3 | 4 | 5 |
|---|---|---|---|---|---|
| Sand | 235 | 260 | 260 | 272 | 272 |
| Litharge | 115 | 140 | 130 | 130 | 130 |
| Sodium carbonate | 133 | 43 | 51 | 51 | 51 |
| Potassium carbonate |  | 44 | 53 | 53 | 53 |
| Stannic oxide | 75 | 50 | 50 | 37.5 | 37.5 |
| Sulfur | 6 | 6 |  |  |  |
| Zinc sulfide |  |  | 6 |  |  |
| Carbon |  |  |  | 4 |  |
| Powdered zinc |  |  |  |  | 15 |

Glasses which are reduced with sulfur or sulfides are particularly heat-sensitive and in the production of thick ware wherein the retention of heat on cooling results in a reheating effect, such glasses can be made black directly without the additional step of reheating. Likewise articles, such as tubes which require multiple gathering, can be made black directly. Thin ware or articles which cool rapidly, such as glass fibres, can be obtained clear and thereafter can be made black by reheating. In general, a temperature of 500°–600° C. is suitable for reheating the new glasses in the clear state to make them black and a maximum heating time of about one hour is sufficient.

I claim:

1. A reduced glass which will become black throughout when slowly cooled or heated through its upper annealing range but which will be clear or white when rapidly cooled from some higher temperature; which contains silica, alkali oxide, lead oxide, and tin oxide, the silica being not over 63%, the alkali oxide ($R_2O$) being from about $(5+2A)-(.17+.07A)X\%$ to $(8+5A+.7X)\%$ but not over $(20+5A)\%$, where A is the ratio $$\frac{K_2O}{R_2O}$$

and X is the deficiency in silica below 63%, the remainder being substantially lead oxide and tin oxide, at least a portion of the lead and tin being in a low state of oxidation.

2. A reduced glass which will become black throughout when slowly cooled or heated through its upper annealing range but which will be clear or white when rapidly cooled from some higher temperature, which contains silica, soda, lead oxide and tin oxide, the silica being not over 63%, the soda being from $(5-.17X)\%$ to $(8+.7X)\%$ but not over 20% $Na_2O$, where X is the deficiency in silica below 63%, the remainder being substantially lead oxide and tin oxide, at least a portion of the lead and tin being in a low state of oxidation.

3. A reduced glass which will become black throughout when slowly cooled or heated through its upper annealing range but which will be clear or white when rapidly cooled from some higher temperature, which contains silica, potash, lead oxide and tin oxide, the silica being not over 63%, the potash being from $(7-.24X)\%$ to $(13+.7X)\%$ but not over 25% $K_2O$, where X is the deficiency in silica below 63%, the remainder being substantially lead oxide and tin oxide, at least a portion of the lead and tin being in a low state of oxidation.

4. A reduced glass which will become black throughout when slowly cooled or heated through its upper annealing range but which will be clear or white when rapidly cooled from some higher temperature; which contains silica, alkali oxide, lead oxide, and tin oxide, the silica being from 35% to 63%, the alkali oxide ($R_2O$) being from about $(5+2A)-(.17+.07A)X\%$ to $(8+5A+.7X)\%$ but not over $(20+5A)\%$, where A is the ratio $$\frac{K_2O}{R_2O}$$

and X is the deficiency in silica below 63%, the remainder being substantially lead oxide and tin oxide, the tin oxide amounting to about 2% to 15% of the total glass as $SnO_2$, at least a portion of the lead and tin being in a low state of oxidation.

5. A reduced glass which will become black throughout when slowly cooled or heated through its upper annealing range but which will be clear or white when rapidly cooled from some higher temperature, which contains silica, soda, lead oxide and tin oxide, the silica being from 35% to 63%, the soda being from $(5-.17X)\%$ to $(8+.7X)\%$ but not over 20% $Na_2O$, where X is the deficiency in silica below 63%, the remainder being substantially lead oxide and tin oxide, the tin oxide amounting to 2% to 15% of the total glass as $SnO_2$, at least a portion of the lead and tin being in a low state of oxidation.

6. A reduced glass which will become black throughout when slowly cooled or heated through its upper annealing range but which will be clear or white when rapidly cooled from some higher temperature, which contains silica, potash, lead oxide and tin oxide, the silica being from 35% to 63%, the potash being from $(7-.24X)\%$ to $(13+.7X)\%$ but not over 25% $K_2O$, where X is the deficiency in silica below 63%, the remainder being substantially lead oxide and tin oxide, the tin oxide amounting to 2% to 15% of the total glass as $SnO_2$, at least a portion of the lead and tin being in a low state of oxidation.

7. A reduced glass which will become black throughout when slowly cooled or heated through its upper annealing range but which will be clear or white when rapidly cooled from some higher temperature; which contains silica, alkali oxide, lead oxide, and tin oxide, the silica being not over 63%, the alkali oxide ($R_2O$) being from about $(5+2A)-(.17+.07A)X\%$ to $(8+5A+.7X)\%$ but not over (20+5A)%, where A is the ratio $$\frac{K_2O}{R_2O}$$

and X is the deficiency in silica below 63%, the remainder being substantially lead oxide and tin oxide, the tin oxide being of about 5% of the total glass, at least a portion of the lead and tin being in a low state of oxidation.

8. A reduced glass which will become black throughout when slowly cooled or heated through its upper annealing range but which will be clear or white when rapidly cooled from some higher temperature, which contains silica, soda, lead oxide and tin oxide, the silica being not over 63%, the soda being from (5−.17X)% to (8+.7X)% but not over 20% Na₂O, where X is the deficiency in silica below 63%, the remainder being substantially lead oxide and tin oxide, the tin oxide being about 5% of the total glass, at least a portion of the lead and tin being in a low state of oxidation.

9. A reduced glass which will become black throughout when slowly cooled or heated through its upper annealing range but which will be clear or white when rapidly cooled from some higher temperature, which contains silica, potash, lead oxide and tin oxide, the silica being not over 63%, the potash being from (7−.24X)% to (13+.7X)% but not over 25% K₂O, where X is the deficiency in silica below 63%, the remainder being substantially lead oxide and tin oxide, the tin oxide being about 5% of the total glass, at least a portion of the lead and tin being in a low state of oxidation.

10. A glass batch comprising materials which contain silicon, alkali, lead and tin, and containing also a sulfurous material of the class consisting of sulfur and sulfide, the batch being equivalent on an oxide basis to not over 63% SiO₂, (5+2A)−(.17+.07A)X% to (3+5A+.7X)% but not over (20+5A)% alkali oxide (R₂O), where A is the ratio $$\frac{K_2O}{R_2O}$$

and X is the deficiency in silica below 63%, the remainder being substantially lead oxide and tin oxide.

11. A reduced glass which contains silica, alkali oxide, lead oxide, tin oxide, reduction products of lead oxide and tin oxide and an oxidation product of sulfur, the silica being not over 63%, the alkali oxide (R₂O) being about (5+2A)−(.17+.07A)X% to (8+5A+.7X)% but not over (20+5A)%, where A is the ratio $$\frac{K_2O}{R_2O}$$

and X is the deficiency in silica below 63%, the remainder being substantially lead oxide and tin oxide and their reduction products.

12. A reduced glass which contains silica, soda, lead oxide, tin oxide, reduction products of lead oxide and tin oxide and an oxidation product of sulfur, the silica being not over 63%, the soda being from (5−.17X)% to (8+.7X)% but not over 20% Na₂O, where X is the deficiency in silica below 63%, the remainder being substantially lead oxide and tin oxide and their reduction products.

13. A reduced glass which contains silica, potash, lead oxide, tin oxide, reduction products of lead oxide and tin oxide and an oxidation product of sulfur, the silica being not over 63%, the potash being from (7−.24X)% to (13+.7X)% but not over 25% K₂O, where X is the deficiency in silica below 63%, the remainder being substantially lead oxide and tin oxide and their reduction products.

14. A glass batch comprising materials which contain silicon, sodium, lead and tin and containing also a sulfurous material selected from the class consisting of sulfur and sulfide, the batch being equivalent on an oxide basis to not over 63% SiO₂, from (5−.17X)% to (8+.7X)% but not over 20% Na₂O, where X is the deficiency in silica below 63%, the remainder being substantially lead oxide and tin oxide.

15. A glass batch comprising materials which contain silicon, sodium, lead and tin and containing also a sulfurous material selected from the class consisting of sulfur and sulfide, the batch being equivalent on an oxide basis to not over 63% SiO₂, from (7−.25X)% to (13+.7X)% but not over 25% K₂O, where X is the deficiency in silica below 63%, the remainder being substantially lead oxide and tin oxide.

MARTIN E. NORDBERG.